( 12 ) United States Patent
Schauder

(10) Patent No.: US 7,053,153 B2
(45) Date of Patent: *May 30, 2006

US007053153B2

(54) ETHYLENE COPOLYMER COMPOSITIONS SUITABLE FOR VISCOSITY INDEX IMPROVERS AND LUBRICANT COMPOSITIONS

(75) Inventor: Jean-Roch Schauder, Wavre (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/433,441

(22) PCT Filed: Nov. 13, 2001

(86) PCT No.: PCT/US01/44343

§ 371 (c)(1),
(2), (4) Date: Jun. 2, 2003

(87) PCT Pub. No.: WO02/46251

PCT Pub. Date: Jun. 13, 2002

(65) Prior Publication Data

US 2004/0034168 A1    Feb. 19, 2004

Related U.S. Application Data

(60) Provisional application No. 60/251,198, filed on Dec. 4, 2000.

(51) Int. Cl.
*C08F 8/00* (2006.01)
*C08L 9/00* (2006.01)
*C08L 23/00* (2006.01)
*C08L 23/04* (2006.01)
*C08G 18/65* (2006.01)

(52) U.S. Cl. ........................ 525/191; 525/232; 525/240
(58) Field of Classification Search ................ 525/191, 525/232, 240
See application file for complete search history.

(56) References Cited

U.S. PATENT DOCUMENTS

| 4,307,209 | A | * | 12/1981 | Morita et al. ................ 525/246 |
| 5,391,617 | A | | 2/1995 | Olivier et al. ................. 525/72 |
| 6,319,998 | B1 | * | 11/2001 | Cozewith et al. ............. 526/65 |
| 6,329,477 | B1 | * | 12/2001 | Harrington et al. ........... 526/65 |
| 6,372,864 | B1 | * | 4/2002 | Brown ......................... 526/65 |

FOREIGN PATENT DOCUMENTS

| EP | 0 638 611 A1 | 2/1995 |
| EP | 0 881 237 A1 | 12/1998 |
| EP | 1 041 090 A1 | 10/2000 |
| WO | WO 97/43323 | 11/1997 |
| WO | WO 98/02471 | 1/1998 |
| WO | WO 99/45040 | 9/1999 |
| WO | WO 99/45049 | 9/1999 |

* cited by examiner

*Primary Examiner*—Nthan M. Nutter

(57) ABSTRACT

The present invention provides processes for making a bimodal solid polymer composition suitable for use as a viscosity index improver. Ethylene and an alpha-olefin comonomer are polymerized in the presence of a metallocene catalyst to form first and second copolymers, in series or parallel reactors, which are combined to form an intimate blend of relatively high and relatively low ethylene content copolymers in the solvent use. The composition can be further grafted and derivatized to provide a viscosity index improver, the composition being produced directly with the correct viscosity, without the need for additional blending, shearing or masticating steps.

19 Claims, No Drawings

ETHYLENE COPOLYMER COMPOSITIONS SUITABLE FOR VISCOSITY INDEX IMPROVERS AND LUBRICANT COMPOSITIONS

This application is the National Stage of International Application No. PCT/US01/44343, filed Nov. 13, 2001, which claims the benefit under 35 U.S.C. §119(e) of U.S. Provisional Application No. 60/251,198, filed Dec. 4, 2000, the entire disclosure of which is incorporated herein by reference.

1. FIELD OF THE INVENTION

The present invention relates to processes for producing bimodal polymer compositions, especially pelletized compositions, grafted bimodal polymer compositions, and grafted and derivatized bimodal polymer compositions. The invention further relates to concentrates obtained from such bimodal polymer compositions suitable for viscosity index improvement and lubricant compositions.

2. BACKGROUND

Lubricant oil formulations generally contain viscosity index ("VI") improving components derived from ethylene-alpha-olefin copolymers, which modify the rheological behavior to increase the lubricant viscosity, and promote a more constant viscosity over the range of temperatures over which the lubricant is used in, for example, automotive engines. Higher ethylene-content copolymers efficiently promote oil thickening, shear stability and low temperature viscometrics, while lower ethylene-content copolymers are added for the purpose of lowering the oil pour point. Typical viscosity index improvers can be functionalized or non-functionalized olefin polymerization products. With functionalization, polar groups are included to provide a dispersant effect for any debris in the oil, such as that generated by engine wear. In a typical process, the VI product is functionalized with maleic anhydride, and optionally is further derivatized by reaction with an amine compound.

Blends of amorphous and semicrystalline ethylene propylene copolymers are known for lubricant oil formulations. The combination of two such ethylene-propylene copolymers allows for increased thickening efficiency, shear stability, low temperature viscosity performance and pour point. See, e.g., U.S. Pat. No. 5,391,617, and EP 0 638,611, the disclosures of which are incorporated herein by reference for purposes of U.S. patent practice.

Using conventional vanadium based Ziegler-Natta catalysts, the general approach is to separately polymerize the two copolymers in an alkane solvent, either hexane in a solution process or propylene in a slurry process, and to finish the polymers to remove the solvent. The two copolymer components have a medium viscosity, and a molecular weight in excess of that needed in the final lubricant formulation, for two reasons. First, most of the traditional EPDM manufacturing plants cannot "finish" low viscosity polymers having the right viscosity for lubricant formulations; and second, low viscosity copolymers tend to cold flow upon storage. The second issue is particularly true for the amorphous copolymers, which have a lower plateau modulus. The bales are then processed by a series of steps to create the final lubricant composition.

In the most generally practiced procedure, the amorphous and semicrystalline components are dissolved in oil at about a 10 wt % concentration, and masticated in the presence of oxygen to obtain overall a scissioning effect which reduces the initial molecular weight. This conventional procedure suffers from several disadvantages. Mastication is a batch process which can take many hours. In addition, the presence of oxygen generates a safety hazard. Moreover, the concentrate then may have to be shipped to the lubricant oil formulator, which generates a long supply line and significant transport costs and so mitigates against the use of blends of amorphous and semicrystalline ethylene propylene copolymers.

In another procedure, the VI improver supplier blends the copolymer components in an extruder, and in that process reduces the blend viscosity by shearing to reduce the initial molecular weight. In both procedures, the medium viscosity of the starting material (and more specifically the amorphous copolymer) is necessary so that the composition does not "cold flow" during storage.

It would be desirable, but has not been heretofore possible, to more directly produce a lubricant composition containing a VI improver in order to reduce overall costs of the totality of steps needed, reduce shipping costs, minimize safety hazards and reduce quality control problems. It would be desirable especially to arrive at the target molecular weight without having to pass through blending or masticating steps which have a molecular weight reducing effect, and to arrive at a composition having the correct viscosity and composition for VI improver applications, without the extra cost and complexity of blending and viscosity-reducing shearing steps. It would further be desirable to determine the copolymer composition to reflect the need for solubility and viscosity improvement. It would still further be desirable to have the capability of making in polymerization, a polymer of a molecular weight which is also desired for the final lubricant formulation, without having to use blending steps which may, intentionally but unavoidably, have a lowering effect on the molecular weight.

Thus, there is a need for processes to produce polymer compositions for VI improvers, and VI improver compositions, which overcome these and other disadvantages of prior art processes for making lubricant formulations and the compositions and ingredients used therein.

3. SUMMARY OF THE INVENTION

3.1 Bimodal Polymer Composition

In one aspect, the present invention is directed to a polymerization process for making a solid bimodal polymer composition, and to bimodal composition obtainable by such process. The bimodal composition is directly produced, without the need for the blending and/or shearing or masticating steps used for separately polymerized, finished and dried copolymer components in, typically, pellet form. Further, the bimodal composition can be provided as a solid composition in pelletized, easily dissolved form, if desired.

As used herein, a composition is "bimodal" because it includes constituent polymer fractions which have different molecular weights, different molecular weight distributions, and/or different monomer compositional or sequence distributions. The constituent fractions are predominantly produced in solution in separate polymerization steps. The separately obtained dissolved polymer fractions are combined before finishing, so that a bimodal composition emerges from the subsequent, shared finishing process. The term "finishing" includes any form of solvent removal and other processing steps which lead to the formation of the polymer composition as a solid with the solvent substantially removed (typically to a concentration of less then 0.1 wt %).

The separate polymerizations may be performed in parallel with the effluent polymer solutions from two reactors combined downstream before the finishing. The separate polymerizations may alternatively be performed in series, where the effluent of one reactor is fed to the next reactor. The selection between the options is one depending on the available plant layout and options, and the type of polymer intended to be made. One skilled in the art can readily select a parallel or series reactor arrangement. For example, series reaction may be favored if one fraction is to be produced at a higher temperature than another fraction, as the heated effluent of a first polymerization can be supplied to a second reactor for polymerization at a higher temperature.

While the parallel and series options appear to be different, the precise composition of the resulting bimodal compositions differs little for purposes of the present invention. While polymer and catalyst can be carried over from the first reactor to the second in series, actually the polymer product produced in the second reactor is not appreciably different compared to the case wherein in parallel reaction the feed to both reactors contains no polymer. In other words, the precise composition of the bimodal composition for purposes of the present invention depends principally on the reactor conditions in the respective reactors.

In each of the reactors, the polymerization is preferably such as to generate a random copolymer, that is to say as random by back-mixing in the reactor as the catalysts selected permit the polymer to be.

In a preferred embodiment, ethylene, an alpha-olefin comonomer and optionally a polyene such as a diene are copolymerized, under solution phase conditions and in the presence of a metallocene catalyst, to form a relatively low ethylene content copolymer in a first reactor. The effluent from the first reactor is directed into a second reactor, where ethylene, an alpha-olefin comonomer that can be the same or different from the alpha-olefin used in the first reactor, and optionally a polyene such as a diene that can be the same or different from the polyene used in the first reactor, are copolymerized in the presence of a metallocene catalyst to form a relatively high ethylene content copolymer. The effluent from the second reactor is then subject to finishing to produce a solid, bimodal composition.

In another embodiment, ethylene, an alpha-olefin comonomer and optionally a polyene such as a diene are copolymerized, under solution phase conditions and in the presence of a metallocene catalyst, to form a relatively high ethylene content copolymer in a first reactor. The effluent from the first reactor is directed into a second reactor, where ethylene, an alpha-olefin comonomer that can be the same or different from the alpha-olefin used in the first reactor, and optionally a polyene such as a diene that can be the same or different from the polyene used in the first reactor, are copolymerized in the presence of a metallocene catalyst to form a relatively low ethylene content copolymer. The effluent from the second reactor is then subject to finishing to produce a solid bimodal composition.

In yet another embodiment, ethylene, an alpha-olefin comonomer and optionally a polyene such as a diene are copolymerized, under solution phase conditions and in the presence of a metallocene catalyst, to form a relatively high ethylene content copolymer in a first reactor. In a second reactor, further ethylene, an alpha-olefin comonomer and optionally a polyene such as a diene are copolymerized, under solution phase conditions and in the presence of a metallocene catalyst, to form a relatively low ethylene content copolymer The effluents from the first and second reactors are then combined prior to finishing to produce a solid bimodal composition. In all of the above embodiments, each polymerization is preferably carried out in a continuous stirred tank reactor to provide random copolymer fractions. The polymer product subjected to finishing is an intimate mixture of the relatively high and relatively low ethylene content copolymers. This product is then finished to form the solid bimodal composition.

Preferably, the solid bimodal composition is produced in a form having a relatively high surface area, such as pellets. The term "pellets" as used herein refers generically to the particles such as can be produced by finishing procedures known in the art. By using sufficiently small pellets, the bimodal composition can be dissolved in the simple process used for blending the components of an oil formulation without, at an intermediate stage, having to be made into a concentrate by mastication or having to pass through an extrusion/blending step.

Preferably, the solid bimodal polymer composition has a solubility in oil of at least 5% by weight and a content of ethylene-derived units of from 70 to 85 mol %. The MFR of the bimodal polymer composition will be intermediate to the MFR of the lower and higher ethylene content copolymers when these copolymers have different MFRs. Alternatively, the MFR of the polymer composition will be similar to the MFR of the copolymers, when the copolymer have similar MFRs. The lower ethylene content copolymer has from 50 to 70 mol % ethylene-derived units and from 50 to 30 mol % comonomer-derived units, an MFR of from 0.2 to and a molecular weight distribution $M_w/M_n$ of from 1.5 to 3. The higher ethylene content copolymer has greater than 70 mol % ethylene-derived units in one embodiment, or greater than 74 mol % ethylene-derived units or greater than 78 mol % ethylene-derived units in other embodiments. The higher ethylene content copolymer can have an MFR of from 0.2 to 25, and an $M_w/M_n$ of from 1.5 to 3. The MFR of the lower and higher ethylene-content copolymers can be the same or different.

3.2 Grafted Bimodal Polymer Composition

In another aspect, the present invention provides a process for making a grafted polymer composition suitable for use as a viscosity index improver, the composition being produced directly as a blend having the "correct" viscosity, i.e., a viscosity suitable for the intended use, without the need for additional blending and shearing steps. The process is carried out as described in the process above, with the additional step of grafting or functionalizing the polymer composition with a desired functional group, preferably grafting with maleic anhydride to form a grafted polymer composition with maleic anhydride functional groups. Preferably, the grafted polymer composition has a maleic anhydride content of from 0.1 to 5 mol %. Optionally, the grafted polymer composition can be further derivatized by reaction with a derivatizing compound, the derivatizing compound including at least one derivatizing group capable of reacting with the maleic anhydride functional group of the grafted polymer composition. Preferably, the derivatizing compound is an amine.

In another aspect, the present invention provides a polymer composition, a grafted polymer composition, or a grafted and derivatized polymer composition, the composition being produced by any of the above-described methods.

In yet another aspect, the present invention provides a composition suitable for use as a lube oil, or as a lube oil concentrate to be made up with added base oil to form the lube oil composition. The composition then includes a mixture of the viscosity index improving composition described above and a base oil such as a hydrocarbon oil or a synthetic lubricating oil.

4. DETAILED DESCRIPTION

4.1 Polymerization Process

Each polymerization is preferably carried out in a continuous stirred tank reactor. When polymerizing in a series reactor layout, the polymer product emerging from the second reactor is an intimate blend of the high and low ethylene content copolymers.

Polymerization is preferably homogeneous solution polymerization in series reactors, using single site catalysts, such as metallocene catalysts. Single site catalysts used in homogeneous solution polymerization provide homogeneous chain length and monomer distribution in the polymers they form. Preferably the single site catalyst has ancillary ligands attached to a metal atom which remains appended under the prevailing polymerization conditions to provide molecular stability, a catalytically active site of constantly and enduring activity. Metallocene catalysts are preferred. The ancillary ligand has a pi-ligand structure, preferably a cyclopentadienyl ring. One or two such rings may be provided. The cyclopentadienyl ring may have hetero-atoms replacing carbons in the ring. Suitable metallocenes are described in detail below. Preferred catalysts are cyclopentadienyl metallocene complexes which have two Cp ring systems for ligands, or monocyclopentadienyl metallocene catalyst. The metallocene complexes may be activated with an alumoxane, e.g., methylalumoxane (MAO) or a non-coordinating anion (NCA) described further below. Optionally, a scavenger component such as a trialkyl aluminum scavenger may be added to the reactor feed(s) to prevent deactivation of catalyst by poisons and to increase the apparent activity.

The reactors are preferably liquid filled, continuous flow, stirred tank reactors providing full back mixing for random copolymer production. Solvent and monomers are fed to each reactor, and catalyst can be fed to the first reactor or to both reactors. Reactors may be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid. Use of hydrogen to control molecular weight may be avoided or reduced, if desired. The reactor temperature may be used to control the molecular weight of the polymer fraction produced. In series operation, this gives rise to a temperature difference between reactors which is helpful for controlling polymer molecular weight and so contributes to the bimodal composition. Comonomers and optional polyenes are described in detail below. Reactor temperature is selected, depending upon the effect of temperature on catalyst deactivation rate and polymer properties and/or extent of monomer depletion. For best monomer conversion, it is desirable to operate at as high a temperature as possible using relatively concentrated polymer solutions. Generally temperatures should not exceed the point at which the concentration of catalyst in the second reactor is insufficient to make the desired polymer component in the desired amount. Therefore, temperature will be determined by the details of the catalyst system. In general, the first reactor temperature can vary between 0–110° C. with 10–90° C. preferred and 20–70° C. most preferred. Second reactor temperatures will vary from 40–160° C. with 50–140° C. preferred and 60–120° C. most preferred. However, in the case of less stable catalysts, catalyst can also be fed to the second reactor when the selected process uses reactors in series. Optimal temperatures can best be achieved, particularly for series operation with progressively increasing polymerization temperature, by using bis cyclopentadienyl catalyst systems containing hafnium as the transition metal, especially those having a covalent, single atom bridge coupling the two cyclopentadienyl rings.

Particular reactor configurations and processes suitable for use in the processes of the present invention are described in detail in U.S., application Ser. No. 09/260,787, filed Mar. 1, 1999, and No. 60/243,192, filed Oct. 25, 2000, the disclosures of which are incorporated herein by reference, for purposes of U.S. patent practice.

4.1.1 Relatively Low Ethylene-Content Copolymer

The relatively low ethylene-content copolymer is a copolymer of ethylene, an alpha-olefin comonomer, and optionally a polyene such as a diene. This copolymer in one embodiment is formed in the first reactor, and in another embodiment is formed in the second reactor. The terms "low" or "relatively low" ethylene content as used herein mean a copolymer having an ethylene content in the range of from 50 to 70 mole percent, with the remaining 30 to 50% mol percent being at least one comonomer.

Suitable comonomers include propylene and $\alpha$-olefins, such as $C_4$–$C_{20}$ $\alpha$-olefins and preferably propylene and $C_4$–$C_{12}$ $\alpha$-olefins. The $\alpha$-olefin comonomer can be linear or branched, and two or more comonomers can be used, if desired. Thus, reference herein to "an alpha-olefin comonomer" includes one, two, or more alpha-olefin comonomers. Examples of suitable comonomers include propylene, linear $C_4$–$C_{12}$ $\alpha$-olefins, and $\alpha$-olefins having one or more $C_1$–$C_3$ alkyl branches. Specific examples include propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituent on any of $C_3$–$C_5$, 1-pentene with two methyl substituents in any stoichiometrically acceptable combination on $C_3$ or $C_4$, 3-ethyl-1-pentene, 1-octene, 1-pentene with a methyl substituent on any of $C_3$ or $C_4$, 1-hexene with two methyl substituents in any stoichiometrically acceptable combination on $C_3$–$C_5$, 1-pentene with three methyl substituents in any stoichiometrically acceptable combination on $C_3$ or $C_4$, 1-hexene with an ethyl substituent on $C_3$ or $C_4$, 1-pentene with an ethyl substituent on $C_3$ and a methyl substituent in a stoichiometrically acceptable position on $C_3$ or $C_4$, 1-decene, 1-nonene, 1-nonene with a methyl substituent on any of $C_3$–$C_9$, 1-octene with two methyl substituents in any stoichiometrically acceptable combination on $C_3$–$C_7$, 1-heptene with three methyl substituents in any stoichiometrically acceptable combination on $C_3$–$C_6$, 1-octene with an ethyl substituent on any of $C_3$–$C_7$, 1-hexene with two ethyl substituents in any stoichiometrically acceptable combination on $C_3$ or $C_4$, and 1-dodecene.

It should be appreciated that the list of comonomers above is merely exemplary, and is not intended to be limiting. Particularly preferred comonomers are propylene and 1-butene. The relatively low ethylene-content copolymer can also contain ethylene with combinations of at least two of the monomers mentioned above.

Optionally, the relatively low ethylene-content copolymer further includes up to 5 mole percent of a polyene-derived unit. The term "copolymer" as used herein is meant to include polymers having two, three or more different monomers. The term "polyene" as used herein is meant to include monomers having two or more unsaturations; i.e., dienes, trienes, etc. Polyenes particularly useful as co-monomers are non-conjugated dienes, preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes are dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo (Δ−11,12) 5,8 dodecene. Note that throughout this application the terms "polyene", "non-conjugated diene" and "diene" are used interchangeably. It is preferred to use dienes which do not lead to the formation of long chain branches. For successful use as VI improver non-or lowly branched polymer chains are preferred. Other polyenes that can be used include cyclopentadiene and octatetra-ene; and The relatively low ethylene-content copolymer has from 50 to 70 mol % ethylene-derived units and from 50 to 30 mol % comonomer-derived units, including the optional 0 to 5 mol % polyene-derived units. Preferably, the relatively low ethylene-content copolymer has an MFR of from 0.2 to 25 and a molecular weight distribution $M_w/M_n$ of from 1.5 to 3.

If desired, hydrogen can be added to the reactor to control the molecular weight of the relatively low ethylene-content copolymer.

The amount of the total polymer produced in the first reactor ("first copolymer"), i.e., the ratio of the mass of the first copolymer to the mass of the copolymer composition, can be from 0.1 to 0.9, preferably from 0.3 to 0.7.

4.1.2 Relatively High Ethylene-Content Copolymer

The relatively high ethylene-content copolymer is a copolymer of ethylene, an alpha-olefin, and optionally a polyene such as a diene. This copolymer in one embodiment is formed in the first reactor, and in another embodiment is formed in the second reactor.

The term "high" or "relatively high" ethylene content as used herein means a copolymer having an ethylene content greater than that of the low ethylene content copolymer, preferably greater than 70 mole percent. Alternatively, the ethylene content can be greater than 74 mole percent or greater than 78 mole percent in other embodiments. The remainder of the copolymer mole percent is one or more comonomers. Suitable alpha-olefins and polyenes include any of those described above in connection with the low ethylene-content copolymer, with propylene and 1-butene being preferred. The optional polyene can be present in an amount of up to 5 mole percent. The alpha-olefin comonomer can be the same or different from the alpha-olefin comonomer used for the low ethylene content copolymer, and the optional diene can also be the same or different from the diene, if used, in the low ethylene copolymer.

Preferably, the relatively high ethylene-content copolymer has an MFR of from 0.2 to 25 and a molecular weight distribution $M_w/M_n$ of from 1.5 to 3.

If desired, hydrogen can be added to the reactor to control the molecular weight of the relatively high ethylene-content copolymer.

4.1.3 Polymer Composition

Prior to finishing, the polymer composition is an intimate blend of the relatively high and relatively low ethylene-content copolymers in the solvent used. The solvent can be removed in a conventional process, such as by evaporation, to form a solid polymer composition. The resulting solid bimodal polymer compositions of the present invention have an ethylene content of from 70 to 85 mole percent, with the balance of 30 to 15 mole percent being at least one comonomer, preferably propylene or 1-butene and from 0 to 5 mole percent of polyene. The solid polymer composition has an MFR which is intermediate to the MFR of the low ethylene-content copolymer and the high ethylene copolymer, if the copolymers have different MFRs. The solid polymer composition has an oil solubility of at least 5% by weight, based on the total weight of polymer composition and oil.

4.2 Catalyst

The polymerizations in both the first and second reactors preferably take place in the presence of a metallocene catalyst. The term "metallocene" and "metallocene catalyst precursor" as used herein shall be understood to refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof. The metallocene catalyst precursors are generally neutral complexes but when activated with a suitable co-catalyst yield an active metallocene catalyst which refers generally to an organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

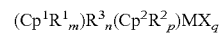

wherein $Cp^1$ of ligand $(Cp^1R^1{}_m)$ and $Cp^2$ of ligand $(Cp^2R^2{}_p)$ are the same or different cyclopentadienyl rings $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two $R^1$ and/or $R^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0 to 8, preferably 0 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula $$(Cp^1R^1_m)R^3_n(Y,R^2)MX_s$$

wherein $R^1$ is, each independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms, $R^3$ is a bridging group, "n" is 0 to 3, M is a transition metal having a valence of from 3 to 6, preferably from group 4, 5, or 6 of the periodic table of the elements and is preferably in its highest oxidation state, Y is a heteroatom containing group in which the heteroatom is an element with a coordination number of three from Group VA or a coordination number of two from group VIA preferably nitrogen, phosphorous, oxygen, or sulfur, $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two R groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of suitable biscyclopentadienyl metallocenes of the type described in group 1 above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein for purposes of U.S. patent practice.

Illustrative, but not limiting, examples of preferred biscyclopentadienyl metallocenes of the type described in group 1 above for the invention are the racemic isomers of:

μ-$(CH_3)_2$Si(indenyl)$_2$M(Cl)$_2$
μ-$(CH_3)_2$Si(indenyl)$_2$M(CH$_3$)$_2$
μ-$(CH_3)_2$Si(tetrahydroindenyl)$_2$M(Cl)$_2$
μ-$(CH_3)_2$Si(tetrahydroindenyl)$_2$M(CH$_3$)$_2$
μ-$(CH_3)_2$Si(indenyl)$_2$M(CH$_2$CH$_3$)$_2$ and
μ-$(C_6H_5)_2$C(indenyl)$_2$M(CH$_3$)$_2$;

wherein M is chosen from a group consisting of Zr and Hf.

Examples of suitable unsymmetrical cyclopentadienyl metallocenes of the type described in group 1 above for the invention are disclosed in U.S. Pat. Nos. 4,892,851; 5,334,677; 5,416,228; and 5,449,651; and are described in publication *J. Am. Chem. Soc.* 1988, 110, 6255, all of which are incorporated by reference herein for purposes of U.S. patent practice.

Illustrative, but not limiting, examples of preferred unsymmetrical cyclopentadienyl metallocenes of the type described in group 1 above for the invention are:

μ-$(C_6H_5)_2$C(cyclopentadienyl)(fluorenyl)M(R)$_2$
μ1-$(C_6H_5)_2$C(3-methylcyclopentadienyl)(fluorenyl)M(R)$_2$
μ-$(CH_3)_2$C(cyclopentadienyl)(fluorenyl)M(R)$_2$
μ-$(C_6H_5)_2$C(cyclopentadienyl)(2-methylindenyl)M(CH$_3$)$_2$
μ-$(C_6H_5)_2$C(3-methylcyclopentadienyl)(2-methylindenyl)M(Cl)$_2$
μ-$(C_6H_5)_2$C(cyclopentadienyl)(2,7-dimethylfluorenyl)M(R)$_2$ and
μ-$(CH_3)_2$C(cyclopentadienyl)(2,7-dimethylfluorenyl)M(R)$_2$;

wherein M is chosen form a group consisting of Zr and Hf, and R is chosen from a group consisting of Cl and CH$_3$.

Examples of suitable monocyclopentadienyl metallocenes of the type described in group 2 above for the invention are disclosed in U.S. Pat. Nos. 5,026,798; 5,057,475; 5,350,723; 5,264,405; 5,055,438 and are described in publication WO 96/002244, all of which are incorporated by reference herein for purposes of U.S. patent practice.

Illustrative, but not limiting, examples of preferred monocyclopentadienyl metallocenes of the type described in group 2 above for the invention are:

μ-$(CH_3)_2$Si(cyclopentadienyl)(1-adamantylamido)M(R)$_2$
μ-$(CH_3)_2$Si(3-tertbutylcyclopentadienyl)(1-adamantylamido)M(R)$_2$
μ-$(CH_3)_2$(tetramethylcyclopentadienyl)(1-adamantylamido)M(R)$_2$
μ-$(CH_3)_2$Si(tetramethylcyclopentadienyl)(1-adamantylamido)M(R)$_2$
μ-$(CH_3)_2$C(tetramethylcyclopentadienyl)(1-adamantylamido)M(R)$_2$
μ-$(CH_3)_2$Si(tetramethylcyclopentadienyl)(1-tertbutylamido)M(R)$_2$
μ-$(CH_3)_2$Si(fluorenyl)(1-tertbutylamido)M(R)$_2$
μ-$(CH_3)_2$Si(tetramethylcyclopentadienyl)(1-cyclododecylamido)M(R)$_2$ and
μ-$(C_6H_5)_2$C(tetramethylcyclopentadienyl)(1-cyclododecylamido)M(R)$_2$;

wherein M is selected from a group consisting of Ti, Zr, and Hf and wherein R is selected from Cl and CH$_3$.

Another class of organometallic complexes that are useful catalysts for the process describe herein are those with diimido ligand systems such as those described in WO 96/23010. These catalytic polymerization compounds are also incorporated herein by reference for purposes of U.S. patent practice. Suitable catalysts are also found in WO 00/105,236, EP 842,939, and WO 96/13529.

4.2.1 Noncoordinating Anions

The term "noncoordinating anion" (NCA) means an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. NCA's are preferred because of their ability to produce a target molecular weight polymer at a higher temperature than tends to be the case with other activation systems such as alumoxane.

Descriptions of ionic catalysts for coordination polymerization using metallocene cations activated by non-coordinating anions appear in the early work in EP-A-0 277 003, EP-A-0 277 004, WO92/00333 and U.S. Pat. Nos. 5,198,401 and 5,278,119. These references teach a preferred method of preparation wherein metallocenes (bisCp and monoCp) are protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion is also known. See, EP-A-0 426 637, EP-A-0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated herein by reference for purposes of U.S. patent practice.

An additional method of making the ionic catalysts uses ionizing anionic pre-cursors which are initially neutral Lewis acids but form the cation and anion upon ionizing reaction with the metallocene compounds, for example tris(pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated herein by reference for purposes of U.S. patent practice.

Examples of suitable activators capable of ionic cationization of the metallocene compounds of the invention, and consequent stabilization with a resulting noncoordinating anion include:

trialkyl-substituted ammonium salts such as:
triethylammonium tetraphenylborate,
tripropylammonium tetraphenylborate,
tri(n-butyl)ammonium tetraphenylborate,
trimethylammonium tetrakis(p-tolyl)borate,
trimethylammonium tetrakis(o-tolyl)borate,
tributylammonium tetrakis(pentafluorophenyl)borate,
tripropylammonium tetrakis(o,p-dimethylphenyl)borate,
tributylammonium tetrakis(m,m-dimethylphenyl)borate,
tributylammonium tetrakis(p-trifluoromethylphenyl)borate,
tributylammonium tetrakis(pentafluorophenyl)borate, and
tri(n-butyl)ammonium tetrakis(o-tolyl)borate;
N,N-dialkyl anilinium salts such as:
N,N-dimethylanilinium tetrakis(pentafluorophenyl)borate,
N,N-dimethylaniliniumtetrakis(heptafluoronaphthyl)borate,
N,N-dimethylanilinium tetrakis(perfluoro-4-biphenyl)borate,
N,N-dimethylanilinium tetraphenylborate,
N,N-diethylanilinium tetraphenylborate, and
N,N-2,4,6-pentamethylanilinium tetraphenylborate;
dialkyl ammonium salts such as:
di-(isopropyl)ammonium tetrakis(pentafluorophenyl)borate, and
dicyclohexylammonium tetraphenylborate; and
triaryl phosphonium salts such as:
triphenylphosphonium tetraphenylborate,
tri(methylphenyl)phosphonium tetraphenylborate, and
tri(dimethylphenyl)phosphonium tetraphenylborate.

Further examples of suitable anionic precursors include those including a stable carbonium ion, and a compatible non-coordinating anion. These include:

tropillium tetrakis(pentafluorophenyl)borate,
triphenylmethylium tetrakis(pentafluorophenyl)borate,
benzene (diazonium) tetrakis(pentafluorophenyl)borate,
tropillium phenyltris(pentafluorophenyl)borate,
triphenylmethylium phenyl-(trispentafluorophenyl)borate,
benzene (diazonium) phenyl-tris(pentafluorophenyl)borate,
tropillium tetrakis(2,3,5,6-tetrafluorophenyl)borate,
triphenylmethylium tetrakis(2,3,5,6-tetrafluorophenyl)borate,
benzene (diazonium) tetrakis(3,4,5-trifluorophenyl)borate,
tropillium tetrakis(3,4,5-trifluorophenyl)borate,
benzene (diazonium) tetrakis(3,4,5-trifluorophenyl)borate,
tropillium tetrakis(3,4,5-trifluorophenyl)aluminate,
triphenylmethylium tetrakis(3,4,5-trifluorophenyl)aluminate, benzene (diazonium) tetrakis(3,4,5-trifluorophenyl)aluminate,
tropillium tetrakis(1,2,2-trifluoroethenyl)borate,
triphenylmethylium tetrakis(1,2,2-trifluoroethenyl)borate,
benzene (diazonium) tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl) borate, and
benzene (diazonium) tetrakis(2,3,4,5-tetrafluorophenyl) borate.

4.2.2 Non-Ionic Activators

Where the metal ligands include halide moieties, for example, (methyl-phenyl) silylene (tetra-methyl-cyclopentadienyl) (tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger its use in excess of that normally stoichiometrically required for alkylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Known alkylalumoxanes are additionally suitable as catalyst activators, particularly for those metallocenes comprising halide ligands. The alumoxane component useful as catalyst activator typically is an oligomeric aluminum compound represented by the general formula $(R-Al-O)_n$, which is a cyclic compound, or $R(R-Al-O)_n AlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

4.2.3 Catalyst Killer

Catalyst killer such as water may be added to the effluent of the reactor or reactors, preferably at the last stage prior to finishing, so as to prevent additional, difficult to control polymerization during finishing. It is possible that the catalyst is effectively spent at the end of the polymerization; however, the more active bis-cyclopentadienyl catalysts and NCA's have sufficient stability to remain active even after the polymerization proper has ended. The amount of killer and the manner of its addition are tailored to ensure that just enough is added to ensure a complete kill. Excess killer may have to be removed by scavenger or other means such as atomic sieves or other purification columns to ensure that killers are not recycled and act as poisons in the polymerization process.

4.2.4 Scavengers

Optionally, the process also uses a scavenging compound. Although trialkyl aluminum is the most preferred scavenger to be used in the invention, other scavengers may be used as set forth below. The term "scavenging compounds" as used in this application and in the claims is meant to include those compounds effective for removing polar impurities from the reaction solvent. Such impurities can be inadvertently introduced with any of the polymerization reaction components, particularly with solvent, monomer and comonomer feed, and adversely affect catalyst activity and stability. It can result in decreasing or even elimination of catalytic activity, particularly when a metallocene cation-noncoordinating anion pair is the catalyst system. The polar impurities, or catalyst poisons include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically the scavenging compound will be an organometallic compound such as the Group-13 organometallic compounds of U.S. Pat. Nos. 5,153,157, 5,241,025, WO-A-91/09882 and WO-A-94/03506, noted above, and that of WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-noncoordinating anion pairs is minimized during polymerization reactions to that amount effective to enhance activity.

The metallocene catalyst component and the activator may be fed to the reactors either separately or premixed.

The catalyst systems especially desirable for polymerization give a combination of high activity, good incorporation of the alpha-olefin and diene into the chain, and polymer molecular weights high enough for elastomer applications at economically attractive reactor temperatures. Catalyst systems particularly preferred for achieving these objectives include $\mu\text{-}(CH_3)_2Si(Indenyl)_2Hf(CH_3)_2$, $\mu\text{-}(CH_3)_2Si[tetramethylcyclopentadienyl][adamantylamido]Ti(CH_3)_2$, and $\mu\text{-}(C_6H_5)_2Si[cyclopentadienyl][fluorenyl]Hf(CH_3)_2$.

4.3 Grafting

In one embodiment, the polymer composition is functionalized by grafting, i.e., the polymer composition is chemically modified by reaction with a grafting reactant to incorporate at least one functional group, preferably a functional group capable of further chemical reaction, e.g., derivatization as described below.

The grafting reactant is at least one ethylenically unsaturated carboxylic acid or carboxylic acid derivative, such as an acid anhydride, ester, salt, amide, imide, or the like. Such reactants include, but are not limited to, the following: acrylic acid, methacrylic acid, maleic acid, fumaric acid, itaconic acid, citraconic acid, mesaconic acid, maleic anhydride, 4-methyl-cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non- 7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, nadic anhydride, methylnadic anhydride, himic anhydride, methylhimic anhydride, and x-methylbicyclo(2.2.1)hept-5-ene-2,3-dicarboxylic acid anhydride (XMNA).

Maleic anhydride is a preferred grafting reactant. As used herein, the term "grafting" denotes covalent bonding of the grafting monomer to a polymer chain of the polymeric composition.

The grafted polymeric composition may be prepared in solution, in a fluidized bed reactor, or by melt grafting as desired. A particularly preferred grafted composition may be conveniently prepared by melt blending the ungrafted polymeric composition, in the substantial absence of a solvent, with a free radical generating catalyst, such as a peroxide catalyst, in the presence of the grafting monomer in an extruder reactor. Single screw but preferably twin screw extruder reactors such as co-rotating intermeshing extruders or counter-rotating non-intermeshing extruders, and co-kneaders such as those sold by Buss, are especially preferred.

In the case of terpolymers containing a diene, the reaction can be performed in absence of a peroxide initiator, using the so-called "ene" reaction chemistry.

The preferred sequence of steps used for the grafting reaction includes melting the polymeric composition, adding and dispersing the grafting reactant, introducing the peroxide catalyst, and venting the unreacted monomer and byproducts resulting from the peroxide decomposition. Alternatively, the grafting reactant and the peroxide can be pre-dissolved in a solvent. The grafting reactant is typically introduced to the reactor in an amount of 0.01 to 10 wt. %, based on the total weight of the polymeric composition and grafting reactant, and preferably 1 to 5 wt. %.

The grafting reaction is carried at a temperature selected to minimize or avoid rapid vaporization or decomposition and consequent losses of the peroxide catalyst and grafting monomer, and to have a residence time about 6 to 7 times the half-life time of the peroxide catalyst. A temperature profile where the temperature of the polymer melt increases gradually along the length of the extrusion reactor up to a maximum in the grafting reaction zone of the reactor, and then decreases toward the reactor output, is preferred. Temperature attenuation in the latter sections of the extruder is desirable for product pelletizing purposes when the grafted polymer has a low viscosity.

In order to optimize the consistency of feeding, the peroxide catalyst is usually dissolved at an approximately 10% to 50% concentration by weight in a mineral oil, whereas the polymer composition and the grafting reactant are fed neat.

Specific examples of useful catalysts include: diacyl peroxides, such as benzoyl peroxide; peroxyesters, such as tert-butylperoxybenzoate, tert-butylperoxyacetate and OO-tert-butyl-O-(2-ethylhexyl)monoperoxycarbonate; peroxyketals, such as n-butyl-4,4-di-(tert-butylperoxy)valerate; and dialkyl peroxides, such as 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxyisopropyl)benzene, di-tert-butylperoxide (DTBP), 2,5-dimethyl-2,5-di(tert-butylperoxy)hexane, and 2,5-dimethyl-2,5-di(tert-butylperoxy)hexyne. Dialkyl peroxides having higher decomposition temperatures are usually preferred.

4.4 Post-Grafting Derivatization

The grafted or functionalized polymer composition can be further reacted to introduce additional functionality. As used herein, a "functionalized polymer" is one which is chemically modified primarily to enhance its ability to participate in a wider variety of chemical reactions than would otherwise be possible with the unfunctionalized polymer. In contrast, a "derivatized polymer" results from further reaction of a functionalized polymer, taking advantage of the chemical reactivity of the grafted functional groups. The functionalized polymer can be derivatized by reaction with at least one derivatizing compound to form a derivatized polymer. The derivatizing compound contains at least one reactive derivatizing group, the derivatizing group selected to be capable of reacting with the functional groups of the functionalized polymers by, for example, nucleophilic substitution, transesterification, salt formations, and the like. The derivatizing compound preferably also contains at least one additional group suitable for imparting desired properties to the derivatized polymer, e.g., polar groups. Thus, such derivatizing compounds typically will contain one or more groups including amine, hydroxy, ether, ester, amide, imide, thio, thioamido, oxazoline or salt groups derived from reactive metal or reactive metal compounds.

In a particular embodiment, the derivatized polymer composition can include the reaction product of the functionalized polymer with a nucleophilic reactant, such as amines, alcohols, amino-alcohols and mixtures thereof, to form oil soluble salts, amides, imides, oxazolines, or esters of mono- and dicarboxylic acids, esters or anhydrides.

The preferred properties sought to be imparted to the derivatized polymer composition include viscosity modification (e.g., primarily viscosity modification with attendant secondary dispersant properties).

Multifunctional viscosity modifiers possess attendant dispersant properties when the polymer from which they are derived is functionalized and derivatized with groups which contribute to dispersancy as described hereinafter.

Various types of multifunctional viscosity modifiers can be made by derivatizing the functionalized polymer compositions of the present invention which are suitable for use in lubricant compositions. The preferred types include reaction products of functionalized polymer compositions of the present invention derivatized with nucleophilic reagents such as amine compounds, e.g., nitrogen-containing compounds, organic hydroxy compounds such as phenols, alcohols, polyethers and/or basic inorganic materials.

More specifically, nitrogen- or ester-containing viscosity modifiers include oil-soluble salts, amides, imides, oxazolines, and esters of the polymer compositions of the present invention, functionalized with mono- and dicarboxylic acids or anhydride or ester derivatives thereof.

In one embodiment, the functionalized polymer composition is derivatized with at least one amine compound. Preferred amine compounds include:

(A)(i) alkylene polyamines of the formula

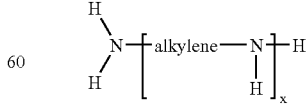

wherein x is an integer from 1 to 10, preferably from 2 to 7, and the alkylene radical is a straight or branched chain alkylene radical having 2 to 7, preferably 2 to 4, carbon atoms; and (ii) polyamino alkenyl or alkyl succinimides of the formula

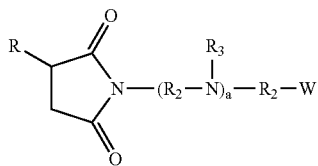

wherein R is alkenyl or alkyl with from 10 to 300 carbon atoms, $R_2$ is an alkylene of 2 to 10 carbon atoms, $R_3$ is hydrogen, lower alkyl or lower hydroxyalkyl, a is an integer from 0 to 10, and W is —$NH_2$; and (B) polyoxyalkylene polyamines of the formula

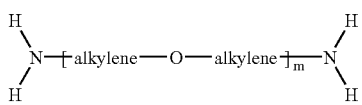

where m is an integer from 3 to 70, preferably from 10 to 35, or

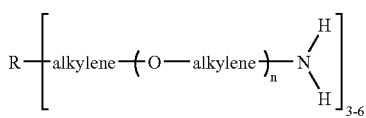

where in each of the 3–6 substituents of R, n is an integer from 1 to 40, and the sum of all the n's is from 3 to 70, preferably from 6 to 35, and R is a polyvalent saturated hydrocarbon radical of up to ten carbon atoms having a valence of 3 to 6. The alkylene groups in either formula (i) or (ii) may be straight or branched chains containing 2 to 7, preferably 2 to 4, carbon atoms.

Examples of alkylene polyamines of formula (A) above include: methylene amines; ethylene amines; butylene amines; propylene amines; pentylene amines; hexylene amines; heptylene amines; octylene amines; other polymethylene amines; and cyclic and higher homologues of these amines, such as piperazines, amino-alkyl-substituted piperazines, etc. Specific examples include: ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methyl-imidazoline, 1,3-bis-(2-aminoethyl)imidazoline, pyrimidine, 1-(2-aminopropyl)-piperazine, 1,4-bis-(2-aminoethyl)piperazine, N,N-dimethyaminopropyl amine, N,N-dioctylethyl amine, N-octyl-N'-methylethylene diamine, 2-methyl-1-(2-aminobutyl) piperazine, etc. Other higher homologues which may be used can be obtained by condensing two or more of the above-mentioned alkylene amines, and such processes are well-known in the art.

The ethylene amines which are particularly useful are described, for example, in *The Encyclopedia of Chemical Technology* under the heading of "Ethylene Amines", (Kirk and Othmer), Volume 5, pp. 898–905, Interscience Publishers, New York (1950). These compounds can be prepared by the reaction of an alkylene chloride with ammonia to form a complex mixture of alkylene amines, including cyclic condensation products such as piperazines. While such mixtures of amines may be used for purposes of this invention, the pure alkylene amines may also be used.

The polyoxyalkylene polyamines of formula (B) above, preferably polyoxyalkylene diamines and polyoxyalkylene triamines, may have average molecular weights ranging from 200 to 4000, and preferably from 400 to 2000. Preferred polyoxyalkylene polyamines include polyoxyethylene and polyoxypropylene diamines, and polyoxypropylene triamines, having average molecular weights ranging from 200 to 2000. Polyoxyalkylene polyamines are commercially available and may be obtained, for example, from the Jefferson Chemical Company, Inc. under the trade name Jeffamine® D-230, D-400, D-1000, D-2000, T-403, etc.

The reactive compounds which can be used to react with the functionalized polymer composition will, of course, depend on the nature of the grafted functional compound. In the case of the preferred grafted functional compound, maleic anhydride, those that will react advantageously with anhydride functionality are appropriate, including alcohols, thioalcohols, and amines. Of these, amines are preferred. Primary amines are more preferred because of the stability of the imide products formed. Most preferred are primary amines, $RNH_2$, in which the R group contains functionalities that are desired in the final product. Although such products contain two functionalities, the imide functionality formed by reaction of the primary amine is relatively inert and serves as a stable linkage between the functionality in the R group and the polymer backbone.

Functionalities that are desirable for inclusion in the product through inclusion in the R group of the primary amine, $RNH_2$, will depend on the application for which the product is intended. For use as a multifunctional viscosity modifier for lubricating oil, it is desired that the R group of the primary amine contain tertiary amine functionality.

Examples of useful primary amines, $RNH_2$, in which the R group contains tertiary amine functionality include: N,N-dimethylethylenediamine; N,N-diethylethylenediamine; N,N-dimethyl-1,3-propanediamine; N,N-diethyl-1,3-propanediamine; 4-aminomorpholine; 4-(aminomethyl)pyridine; 4-(2-aminoethyl)morpholine; and 4-(3-aminopropyl) morpholine.

Examples of useful primary amines, $RNH_2$, in which the R group contains secondary amine functionality include: N-methylethylenediamine; N-ethylethylenediamine; N-phenylethylenediamine; N-methyl-1,3-propanediamine; N-phenyl-1,2-phenylenediamine; N-phenyl-1,4-phenylenediamine; 1-(2-aminoethyl)piperazine; and 4-(aminomethyl) piperidine.

Examples of useful primary amines, $RNH_2$, in which the R group contains alcohol functionality include: ethanolamine; 2-amino-1-propanol; 3-amino-1-propanol; 2-amino-1-butanol; and 2-aminobenzyl alcohol Preferred reactive compounds for reaction with grafted maleic anhydride in the practice of this invention are 4-(3-aminopropyl)morpholine and 1-(2-aminoethyl)piperazine.

Still other amines useful in the practice of this invention include aminoaromatic polyamine compounds such as:

(a) N-arylphenylenediamines of the formula:

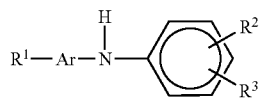

wherein Ar is aromatic; $R^1$ is hydrogen, —NH-aryl, —NH-aralkyl, or a branched or straight chain $C_4$ to $C_{24}$ alkyl, alkenyl, alkoxyl, aralkyl, alkaryl, hydroxyalkyl or aminoalkyl group; $R^2$ is $NH_2$, —$(NH(CH_2)_n—)_m—NH_2$, —$CH_2—(CH_2)_n—NH_2$, or —aryl-$NH_2$, where n and m are independently from 1 to 10; and $R^3$ is hydrogen or $C_4$ to $C_{24}$ alkyl, alkenyl, alkoxyl, aralkyl, or alkaryl;

(b) N-arylphenylenediamines of the formula:

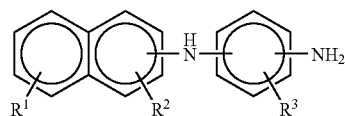

wherein $R^1$, $R^2$ and $R^3$ are each independently hydrogen or a linear or branched hydrocarbon radical containing from 1 to 10 carbon atoms that may be alkyl, alkenyl, alkoxyl, alkaryl, aralkyl, hydroxyalkyl, or aminoalkyl;

(c) an aminocarbazole of the formula:

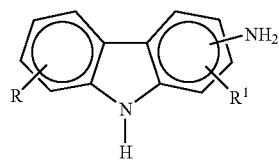

wherein R and $R^1$ are each independently hydrogen or an alkyl, alkenyl, or alkoxyl radical having from 1 to 14 carbon atoms;

(d) an aminoindole of the formula:

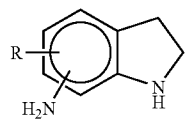

wherein R is hydrogen or an alkyl radical having from 1 to 14 carbon atoms;

(e) an amino-indazolinone of the formula:

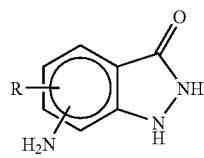

wherein R is hydrogen or an alkyl radical having from 1 to 14 carbon atoms;

(f) an aminoindazole of the formula:

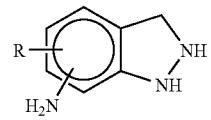

(g) an aminomercaptotriazole of the formula:

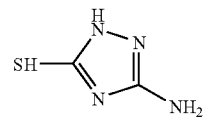

(h) an aminoperimidine represented by the formula:

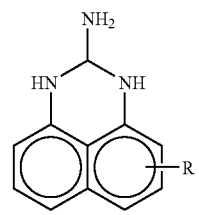

wherein R is hydrogen or an alkyl or alkoxyl radical having from 1 to 14 carbon atoms.

Particularly preferred N-arylphenylenediamines are the N-phenylphenylenediamines, for example, N-phenyl-1,4-phenylenediamine, N-phenyl-1,3-phenylenediamine, N-phenyl-1,2-phenylenediamine, N-naphthyl-phenylenediamine, N-phenyl-naphthalenediamine and N'-aminopropyl-N-phenylphenylene-diamine.

Other useful amines include: aminothiazoles selected from the group consisting of aminothiazole, aminobenzothiazole, aminobenzothiadiazole and aminoalkylthiazole; and aminopyrroles of the formula:

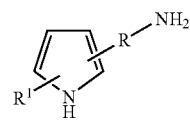

wherein R is a divalent alkylene radical having 2–6 carbon atoms and $R^1$ is hydrogen or an alkyl radical having from 1 to 14 carbon atoms.

Still other useful amines include: phenothiazine and phenothiazine derivatives, particularly 10-aminopropylphenothiazine, amino- 3-propylaminophenothiazine, N-aminopropyl-2-naphthylamine and N-aminopropyldiphenylamine; and amines of the general formula:

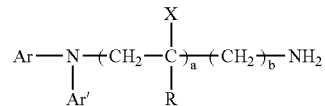

wherein Ar and Ar' are linked together to form a heterocyclic structure with the nitrogen to which they are attached; R is a hydrogen atom, a $C_1$-$C_{18}$ linear or branched alkyl radical or an aromatic radical; X is a hydrogen atom, halogen, OH or $NH_2$ group; a is an integers from 0 to 5; b is an integer from 0 to 6; and the sum a+b is at least 1.

All the reactions described in this section can be performed either in the melt or in solution in lubricating oils. When performed in the melt, the two consecutive reactions (i.e., the grafting and the post-grafting derivatization) can be accomplished in a two-stage or one-stage process. For economical reasons, the one-stage process is preferred. This has been described in U.S. Pat. No. 5,552,096, the disclosure of which is incorporated herein by reference for purposes of U.S. patent practice.

4.5 Other Functionalization

Functionalization of the polymer composition to give a derivatized polymer in a single stage process can also involve processes other than those described above. For example, vinylnitrogen monomers can be directly grafted (see EP 0 429 565 B1, page 6). As an additional example, terpolymers of the composition of the invention can also be functionalized through the use of Schiff bases (see EP4,448, 974, column 3). One skilled in the art will readily recognize other types of functionalization suitable for use with the compositions of the present invention.

4.6 Lubricant Formulations

In a particular embodiment, the grafted polymer composition, or the grafted and derivatized polymer composition, is used as a viscosity index ("VI") improver for an oil composition. In this embodiment, the grafted polymer composition or the grafted and derivatized polymer composition has a solubility in oil of at least 10 wt %. From 0.001 to 49 wt % of this composition is incorporated into a base oil, such as a lubricating oil or a hydrocarbon fuel, depending upon whether the desired product is a finished product or an additive concentrate. The amount of the VI improver is an amount which is effective to improve or modify the viscosity index of the base oil, i.e., a viscosity improving effective amount. Generally, this amount is from 0.001 to 20 wt % for a finished product (e.g., a fully formulated lubricating oil composition), with alternative lower limits of 0.01%, 0.1% or 1%, and alternative upper limits of 15% or 10%, in other embodiments. Ranges of VI improver concentration from any of the recited lower limits to any of the recited upper limits are within the scope of the present invention, and one skilled in the art can readily determine the appropriate concentration range based upon the ultimate solution properties.

Base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the VI improver compositions of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

The lubricating oils to which the products of this invention can be added include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the VI improver compositions of the present invention may be suitably incorporated into synthetic base oils such as alkyl esters of dicarboxylic acids, polyglycols and alcohols; polyalphaolefins; polybutenes; alkyl benzenes; organic esters of phosphoric acids; polysilicone oils; etc. The VI compositions of the present invention can also be utilized in a concentrate form, such as from 1 wt % to 49 wt. % in oil, e.g., mineral lubricating oil, for ease of handling, and may be prepared in this form by carrying out the reaction of the invention in oil as previously described.

The above oil compositions may optionally contain other conventional additives, such as, for example, pour point depressants, antiwear agents, antioxidants, other viscosity-index improvers, dispersants, corrosion inhibitors, antifoaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 66 to 316° C. Neutralization of the phosphosulfurized hydrocarbon may be effected in the manner taught in U.S. Pat. No. 1,969,324, the disclosure of which is incorporated herein by reference for purposes of U.S. patent practice.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc.

Other oxidation inhibitors or antioxidants useful in this invention include oil-soluble copper compounds, such as described in U.S. Pat. No. 5,068,047, the disclosure of which is incorporated herein for purposes of U.S. patent practice.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of these references are incorporated by reference herein for purposes of U.S. Patent practice. Preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants, otherwise known as lube oil flow improvers, lower the temperature at which the fluid will flow or can be poured. Such additives are well known in the art. Typically of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate, which also serves as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Compositions when containing these conventional additives are typically blended into the base oil in amounts which are effective to provide their normal attendant function. Thus, typical formulations can include, in amounts by weight, a VI improver of the present invention (0.01–12%); a corrosion inhibitor (0.01–5%); an oxidation inhibitor (0.01–5%); depressant (0.01–5%); an anti-foaming agent (0.001–3%); an anti-wear agent (0.001–5%); a friction modifier (0.01–5%); a detergent/rust inhibitor (0.01–10%); and an oil base.

When other additives are used, it may be desirable, although not necessary, to prepare additive concentrates comprising concentrated solutions or dispersions of the viscosity index improver (in concentrate amounts hereinabove described), together with one or more of the other additives, such a concentrate denoted an "additive package," whereby several additives can be added simultaneously to the base oil to form a lubricating oil composition. Dissolution of the additive concentrate into the lubricating oil may be facilitated by solvents and by mixing accompanied with mild heating, but this is not essential. The additive-package will typically be formulated to contain the viscosity index improver and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from 2.5 to 90%, preferably from 5 to 75%, and still more preferably from 8 to 50% by weight additives in the appropriate proportions with the remainder being base oil.

The final formulations may use typically about 10 wt. % of the additive-package with the remainder being base oil.

4.7 Blending with Base Oil

Conventional blending methods are described in U.S. Pat. No. 4,464,493, the disclosure of which is incorporated herein by reference for purposes of U.S. patent practice. This conventional process requires passing the polymer through an extruder at elevated temperature for degradation of the polymer and circulating hot oil across the die face of the extruder while reducing the degraded polymer to particle size upon issuance from the extruder and into the hot oil. The pelletized, solid polymer compositions of the present invention, as described above, can be added by blending directly with the base oil so as give directly viscosity for the VI improver, so that the complex multi-step process of the prior art is not needed. The solid polymer composition can be dissolved in the base oil without the need for additional shearing and degradation processes.

The polymer compositions will be soluble at room temperature in lube oils at up to 10 percent concentration in order to prepare a viscosity modifier concentrate. Such concentrate, including eventually an additional additive package including the typical additives used in lube oil application as described above, is generally further diluted to the final concentration (usually around 1%) by multigrade lube oil producers. In this case, the concentrate will be a pourable homogeneous solid free solution.

The polymer compositions preferably have a shear stability index (SSI) (determined according to ASTM D97) of from 10 to 50.

5. EXAMPLES

Materials and Methods

Fourier Transformed Infrared (FTIR) spectroscopy according to ASTM D3900 was used to determine the polymer composition, specifically ethylene content. The polymers were compressed at a temperature of 165° C. into thin films from which infrared spectra were taken, using a Nicolet Avatar 360 Fourier Transform Infrared Spectrometer at 2 cm$^{-1}$ resolution, with an accumulation of 100 scans.

Carbon-13 NMR ($^{13}$C NMR) was also used to characterize the polymer compositions. Metallocene catalysts are known to polymerize alpha-olefins very regioselectively, so that alpha-olefins are mainly incorporated in a 1,2 manner during polymerization, while there is almost no 2,1 incorporation. The presence or absence of regio-irregularities or regio-inversions can be evidenced by the use of $^{13}$C NMR as described by Randall in Polymer Sequence Determination: $^{13}$C NMR Methods (Academic Press, 1977).

Methylene carbons located along the backbone of an ethylene alpha-olefin copolymer chain are identified by a pair of Greek letters, indicating the location of the nearest methine carbons in either direction. The Greek letter α indicates that a methine carbon is directly bonded to the methylene carbon of interest. The Greek letters β, γ and δ indicate that a methine carbon is 2, 3 or 4 carbons removed, respectively, from the carbon of interest. Since neighboring carbon contribution to chemical shifts seldom exceeds four carbon away from each other, a methine carbon four or more carbons from the methylene carbon of interest is indicated by a δ. This principle is applied below to describe following sequences:

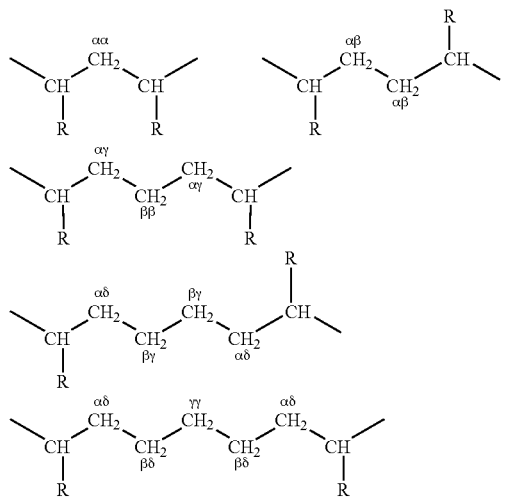

A sequence identified as αβ corresponds to 2 propylene units successively incorporated in 1,2 and 2,1 whereas a sequence identified as βγ corresponds to a P-E-P sequence where one propylene unit is incorporated in a 2,1 manner. The polymer was dissolved at 125° C. in a 80/20 mixture of 1,2,4 trichlorobenzene and deuterobenzene to a concentration of 20 volume %. A high resolution (125.7 MHz) NMR was used. The NMR was run in a full decoupling mode with a pulse time of 2 seconds and a 48 seconds delay between pulses with a total of 1024 pulses. Spectrum characterization and analysis was performed according to Randall.

Maleic anhydride (MA) content was measured by FTIR. The peak height of the anhydride absorption band at 1790 $cm^{-1}$ and of the acid absorption band (from anhydride hydrolysis in air) at 1712 $cm^{-1}$ was compared with a band at 4328 $cm^{-1}$ serving as internal standard. The total percentage of maleic anhydride (% MA) was then calculated by the formula:

% $MA = a + k(A_{1790} + A_{1712})/A_{4328}$, where "a" and "k" are constants determined by internal calibration with internal standards and having values 0.09 and 0.19, respectively.

The imide (generated after reaction of maleic anhydride with N-aminopropyl morpholine (NAPM)) content was measured by comparing the peak height of the imide absorption band at 1705 $cm^{-1}$ with a band at 4328 $cm^{-1}$ serving as an internal standard, and is reported as an imid ratio. The imid ratio can be correlated to a functionality content expressed in mmol per gram of polymer.

MFR (Melt Flow Rate) of the polymers was measured according to ASTM D1238 at 230° C., with a 2.16 kg load.

Kinematic viscosity was measured at 100° C. according to ASTM D445.

Thickening Efficiency (TE) was determined according to ASTM D445.

High temperature high shear (HTHS) viscosity was measured at 150° C. according to ASTM D5481.

Cold cranking simulator (CCS) tests were performed at −20° C. according to ASTM D5293.

Mini rotary viscometer (MRV) tests were performed at −30° C. according to ASTM D4684.

Pour point was determined according to ASTM D97.

Shear stability index (SSI) was determined according to ASTM D3945.

Dimensional stability is assessed by leaving 20 grams of pellets in a cylindrical glassware under a weight of 580 grams in an air oven at 50° C. for 7 days. The ease of pellet de-agglomeration (measure of storage stability) is then evaluated by measuring the force necessary to break the agglomerated pellets.

Example 1

A polymer composition was synthesized in two continuous stirred tank reactors connected in series. The effluent from the first reactor, containing polymer produced therein and unreacted monomer, was fed, with additional monomer, to a second reactor where the polymerization was continued. The fraction of the total polymer composition made in the first reactor was 30% by weight. The polymerization was performed in solution, using hexane as a solvent.

In the first reactor, polymerization was performed at a temperature of 90° C., an overall pressure of 20 bar and ethylene and propylene feed rates of 1.3 kg/hr and 2 kg/hr, respectively. As catalyst, N,N-dimethylanilinium tetrakis (pentafluorophenyl)boron was used to activate [cyclopentadienyl(2,7-di-t-butylfluorenyl)di-p-triethylsilanephenylmethane] hafnium dimethyl. In the process, hydrogen addition and temperature control were used to achieve the desired MFR. The catalyst, activated externally to the reactor, was added as needed in amounts effective to maintain the target polymerization temperature.

In the second reactor, polymerization was performed with the same overall pressure and catalyst feed rate, but with ethylene and propylene feed rates of 4.9 kg/hr and 1.8 kg/hr, respectively, and at a temperature of 130° C.

The mixed copolymer solution emerging from the second reactor was killed and then devolatilized using conventionally known devolatilization methods such as flashing or liquid phase separation, first by removing the bulk of the hexane to provide a concentrated solution, and then by stripping the remainder of the solvent in anhydrous conditions using a LIST devolatilizer or a twin screw develoatilizing extruder so as to end up with a molten polymer composition containing less than 0.5 wt % of solvent and other volatiles. The molten polymer composition was advanced by a screw to a pelletizer from which the polymer composition pellets are submerged in water and cooled until solid.

Example 2

A polymer composition was synthesized generally as in Example 1, but concentrations and temperature were modified as described further in reference to Table 1.

The characteristics of the polymer compositions and pellets from Examples 1 and 2 are reported in Table 1. Tn the Table, the polymer produced in the first reactor is denoted "Polymer A", the Polymer produced in the second reactor is denoted "polymer B", and the polymer composition containing both polymers A and B is denoted "Final Polymer" or "FP". The characteristics of Polymer A and the Final Polymer were determined by direct measurement of a sample taken from the outlets of the first and second reactors, respectively. The characteristics of Polymer B were determined by calculation as follows.

The MFR of Polymer B is calculated from the following equation:

$$\frac{1}{MFR_{FP}} = \left(\frac{1}{MFR_A}\right)^\alpha \left(\frac{1}{MFR_B}\right)^{1-\alpha}$$

where $MFR_{FP}$ is the MFR of the final polymer, $MFR_A$ is the MFR of Polymer A, $MFR_B$ is the (calculated) MFR of Polymer B, and a is the fraction (by weight) of the total polymer produced in the first reactor; i.e., $$\alpha = \frac{M_A}{M_{FP}}$$

where $M_A$ is the mass of Polymer A and $M_{FP}$ is the mass of the final polymer. The value of a is from 0.1 to 0.9. When the measured values of $MFR_{FP}$, $MFR_A$ and a are used in the above equation, MFRB can be calculated.

The ethylene content of the polymer produced in the second reactor is calculated according to the following equation:

$$Et_{FP} = \alpha Et_A + (1-\alpha) Et_B$$

where $Et_{FP}$ is the ethylene content of the final polymer, $Et_A$ is the ethylene content of Polymer A, and $Et_B$ is the calculated ethylene content of Polymer B.

TABLE 1

|  | Example 1 | Example 2 |
| --- | --- | --- |
| MFR$_{FP}$ (g/10 min)* | 6.1 | 6.0 |
| MFRA (g/10 min)* | 12.1 | 10.6 |
| MFRB (g/10 min)* | 4.5 | 3.8 |
| EtFP (wt %) | 66.2 | 65.3 |
| EtA (wt %) | 48.2 | 50.8 |
| EtB (wt %) | 73.9 | 77.2 |
| α | 0.30 | 0.45 |
| Mw/Mn | 1.9 | 2 |
| Force to deagglomerate | 95 N | not measured |

*230° C., 2.16 kg

Example 3

The polymer compositions of Examples 1 and 2, and Paratone™ 8900 which is commercially available viscosity improver polymer made using traditional Ziegler-Natta catalysis, were analyzed by $^{13}C$ NMR as described above. The results are shown in Table 2, as percentages of each sequence length (number of methylene units) having the indicated sequence type.

TABLE 2

| Seq. Length | Seq. Type | Example 1 | Example 2 | P.8900* |
| --- | --- | --- | --- | --- |
| 1 | α-α | 18.1 | 22.7 | 16.3 |
| 2 | α-β | 0.4 | 0.7 | 11.4 |
| 3 | β-β | 27.4 | 28.5 | 17.8 |
| 4 | β-γ | 0.5 | 0.2 | 5.6 |
| 5 | γ-γ | 14.8 | 17.0 | 11.3 |
| 6 or more | γ-δ | 38.9 | 30.9 | 37.6 |

*Paratone ™ M 8900

The average sequence length for Examples 1, 2 and P8900 was 6.9, 6.0 and 6.7 methylene sequences, respectively. As the data show, polymer compositions of the present invention (Examples 1 and 2) contain very low amounts of α-β and β-γ sequences, and are thus almost free of regio-inversion. In contrast, the P8900 sample, prepared conventionally by blending and viscbreaking conventional Ziegler-Natta ethylene-propylene copolymers, contains significant amounts of regio-inversion.

Example 4

The polymer composition from Example 1 was dissolved in STS ENJ102 oil available form ExxonMobil at a 1.5 wt % concentration, to resemble commercially used lubricant formulations. The solution thickening efficiency (TE) and shear stability index (SSI) were measured and compared to a similar solution of Paratone™ 8900 which is commercially available viscosity improver polymer made by separate solution and devolatilization of different ethylene-propylene copolymer fractions followed by blending and viscbreaking in a twin screw extruder. Results are given in Table 3.

TABLE 3

|  | Example 1 | P8900 |
| --- | --- | --- |
| Thickening Efficiency | 1.93 | 1.98 |
| Shear Stability Index (%) | 18 | 21 |

The ethylene-propylene copolymer components can be recovered from the formulation by precipitating them using a non-solvent such as acetone.

Example 5

11.3 wt. % of the polymer composition of Example 1 was dissolved in a SAE 10W40 base oil containing 14.8 wt. % of a detergent inhibitor package, 0.3 wt. % of a pour point depressant, 58% of Chevron 100 and 42% of Chevron 220 oils available from Chevron. Properties of the finished oils are reported in Table 4 and compared to a finished oil containing Paratone™ 8900, which is a typical commercial viscosity modifier. This formulation resembles a typical concentrate as may be used by commercial lubricant formulators and relies on the solubiity of the copolymers.

commercial viscosity modifier polymer. This formulation resembles a typical concentrate as may be used by commercial lubricant formulators and relies on the solubility of the copolymers.

TABLE 4

|  | Example 1 | Paratone ™ TM 8900 |
| --- | --- | --- |
| Kinematic Viscosity at 100° C. (cSt) | 14.25 | 14.13 |
| CCS at −20° C. (Cp) | 3250 | 3180 |
| MRV at −30° C. (Cp) | 17300 | 21515 |
| HTHS (Cp) | 4.04 | 4.02 |
| Pour Point (° C.) | −30 | −30 |

These data demonstrate that polymer compositions of the present invention can be processed into lubricant formulations having properties similar to those of formulations made from components prepared by more complex and more expensive multi-step methods.

Example 6

The polymer composition from Example 2 was grafted as follows. The polymer composition was fed to a twin screw extruder at a 7 kg/hr feed rate with 1.65 wt % of Crystalman™ maleic anhydride (available from Siber Hegner raw materials Ltd, Zurich, CH) and 0.05% of a 10% by weight solution of Luperox™ 130 (available from Pennwalt Corporation) in Marcol™ oil (a white mineral oil from ExxonMobil). The extruder temperature was set at 180°, 190°, 210° and 210° C. over 4 zones, respectively, with the die at 180° C. and a screw speed of 210 rpm. The grafting level was determined by FTIR and corresponds to 1.2 wt % maleic anhydride; the grafted polymer had an MFR (230° C., 2.16 kg) of 11 g/10 min. The maleic anhydride-grafted polymer composition was recovered after under-water pelletization and drying, and fed to a twin screw extruder at a 7 kg/hr feed rate with 4.2% of NAPM (N-aminopropyl morpholine). The extruder temperature was set at 180°, 190°, 230° and 190° C. over 4 zones, respectively, with the die at 180° C. and the screw speed at 140 rpm. The final polymer had an MFR (230° C., 2.16 kg) of 11 g/10 min and an imide ratio of 7.5, corresponding to a functionality level of 0.12 mmol/g of polymer

Example 7

The polymer composition of Example 2 was grafted and derivatized as follows. The polymer composition was fed to a twin screw extruder at a 7 kg/hr feed rate with 2.8% of Crystalman™ maleic anhydride and 0.12% of a 10% by weight solution of Luperox™ 130 in Marcol™ oil. The extruder temperature was set at 180°, 190°, 210° and 210° C. over 4 zones, respectively, with the die at 180° C. and a screw speed of 210 rpm. The grafting level achieved was 2.2 wt % maleic anhydride and the MFR (230° C., 2.16 kg) was 2.8 g/10 min. The maleic anhydride-grafted polymer composition was recovered after under-water pelletization and drying, and fed to a twin screw extruder at a 7 kg/hr feed rate with 8% of N-aminopropyl morpholine). The extruder temperature was set at 180°, 190°, 230° and 190° C. over 4 zones, respectively, with the die at 180° C. and the screw speed at 130 rpm. The final polymer had an MFR (230° C., 2.16 kg) of 8 g/10 min and an imide ratio of 14, corresponding to a functionality level of 0.22 mmol/g of polymer. This example shows that using a low molecular weight series reactor backbone allows an increase in the functionality level by 90%.

Example 8

The chemically modified polymer compositions of Examples 6 and 7 were dissolved in ENJ102 oil at a 1.5 wt % concentration. The resulting solution thickening efficiency and shear stability index were measured and compared to a similar solution of Paratone™ 8950, a commercially available DOCP (dispersant olefin copolymer) (ExxonMobil). The results are given in Table 5.

TABLE 5

| | Example 6 | Example 7 | Paratone ™ 8950 |
|---|---|---|---|
| Thickening Efficiency | 2.5 | 2.43 | 2.5 |
| Shear Stability Index (%) | 19 | 19 | 21 |

The data of Examples 6–8 further demonstrate that polymer compositions of the present invention can be processed into lubricant formulations having properties similar to those of formulations made from components prepared by more complex and more expensive multi-step methods.

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

The invention claimed is:

1. A process for making a solid polymer composition, the process comprising:
   (a) copolymerizing ethylene and a first comonomer component comprising at least one monomer selected from the group consisting of $C_3$ to $C_{20}$ alpha olefins under solution phase conditions and in the presence of a metallocene catalyst in a first reactor to form an effluent comprising a first copolymer;
   (b) directing the effluent to a second reactor in series with the first reactor;
   (c) copolymerizing ethylene and a second comonomer component comprising at least one monomer selected from the group consisting of $C_3$ to $C_{20}$ alpha olefins under solution phase conditions and in the presence of a metallocene catalyst in a second reactor to form a second copolymer mixed with the first copolymer in solution; and
   (d) drying the copolymer mixture to form a solid polymer composition,
   wherein:
   (i) the first and second copolymers have different mole percents of ethylene-derived units, with one copolymer having a lower ethylene content and the other copolymer having a higher ethylene content;
   (ii) the copolymer having a lower ethylene-content comprises from 50 to 70 mol % ethylene-derived units and has an MFR of from 0.2 to 25 g/10 min according to ASTM D1238 at 230° C., with a 2.16 Kg load; and
   (iii) the solid polymer composition has a solubility in oil of at least 5% by weight and a content of ethylene-derived units of from 70 to 85 mol %.

2. The process of claim 1, wherein the copolymer having a higher ethylene content has greater than 74 mol % ethylene-derived units and an MFR of from 0.2 to 25 g/10 mm according to ASTM D1238 at 230° C., with a 2.16 Kg load.

3. The process of claim 2, wherein the copolymer having a higher ethylene content has greater than 78 mol % ethylene-derived units.

4. The process of claim 1, wherein each of the first copolymer and the second copolymer has a molecular weight ratio $M_w/M_n$ of from 1.5 to 3.

5. The process of claim 1, wherein the first copolymer is the lower ethylene content copolymer.

6. The process of claim 1, wherein the second copolymer is the lower ethylene content copolymer.

7. The process of claim 1, wherein from 30 to 70% by weight of the polymer composition is produced in the first reactor.

8. The process of claim 1, wherein the first comonomer component further comprises a diene monomer, and the first copolymer further comprises from 0.01 to 5 mol % diene-derived units.

9. The process of claim 1, wherein the second comonomer component further comprises a diene monomer, and the second copolymer further comprises from 0.01 to 5 mol % diene-derived units.

10. The process of claim 1, wherein each of the first comonomer and the second comonomer components further comprises a diene monomer, and the polymer composition further comprises from 0.01 to 5 mol % diene-derived units.

11. The process of claim 1, wherein the first comonomer component comprises propylene.

12. The process of claim 1, wherein the second comonomer component comprises propylene.

13. The process of claim 1, wherein the metallocene catalysts in the first and second reactors are bridged hafnium complexes.

14. The process of claim 1, wherein the metallocene catalysts in the first and second reactors are activated by a non- or weakly-coordinated anion.

15. The process of claim 1, wherein the first reactor and the second reactor are continuous stirred tank reactors.

16. The process of claim 1, further comprising adding hydrogen to the first reactor, the second reactor, or both, in an amount sufficient to reduce the molecular weight of the polymer formed therein.

17. The process of claim 1, wherein the process is carried out without additional blending, shearing or masticating steps.

18. A polymer composition produced by the process of claim 1.

19. A process for making a solid bimodal polymer composition, the process comprising:
  (a) copolymerizing ethylene and a first comonomer component comprising at least one monomer selected from the group consisting of $C_3$ to $C_{20}$ alpha olefins under solution phase conditions and in the presence of a metallocene catalyst to form a first copolymer;
  (b) copolymerizing ethylene and a second comonomer component comprising at least one monomer selected from the group consisting of $C_3$ to $C_{20}$ alpha olefins under solution phase conditions and in the presence of a metallocene catalyst to form a second copolymer;
  (c) combining the first copolymer and the second copolymer in solution; and
  (d) drying the copolymer blend to form a solid polymer composition,
  wherein:
    (i) the first and second copolymers have different mole percents of ethylene-derived units, with one copolymer having a lower ethylene content and the other copolymer having a higher ethylene content;
    (ii) the copolymer having a lower ethylene-content comprises from 50 to 70 mol % ethylene-derived units and has an MFR of from 0.2 to 25 g/10 min according to ASTM D1238 at 230° C., with a 2.16 Kg load; and
    (iii) the solid polymer composition has a solubility in oil of at least 5% by weight and a content of ethylene-derived units of from 70 to 85 mol %.

* * * * *